(12) United States Patent
Suptil

(10) Patent No.: US 6,708,996 B1
(45) Date of Patent: Mar. 23, 2004

(54) MANPOWER-DRIVEN CYCLE WITH ROWER MECHANISM

(75) Inventor: Thierry Suptil, 202 Avenue G Clemenceau, BP802, F-73000 Chambery (FR)

(73) Assignee: Thierry Suptil, Chambery (FR)

( * ) Notice: Subject to any disclaimer, the term of this patent is extended or adjusted under 35 U.S.C. 154(b) by 0 days.

(21) Appl. No.: 09/979,797

(22) PCT Filed: May 29, 2000

(86) PCT No.: PCT/FR00/01452
§ 371 (c)(1),
(2), (4) Date: Dec. 26, 2001

(87) PCT Pub. No.: WO00/73128
PCT Pub. Date: Dec. 7, 2000

(30) Foreign Application Priority Data

May 28, 1999 (FR) .............................................. 99 06914

(51) Int. Cl.[7] .............................................. B62M 1/04
(52) U.S. Cl. ..................................... 280/242.1; 280/244
(58) Field of Search .............................. 280/242.1, 244, 280/250

(56) References Cited

U.S. PATENT DOCUMENTS

| | | | | |
|---|---|---|---|---|
| 1,230,801 A | * | 6/1917 | Schriver | |
| 1,368,610 A | * | 2/1921 | Dahl | 280/224 |
| 4,108,460 A | * | 8/1978 | Silva, Jr. | 280/236 |
| 4,925,200 A | * | 5/1990 | Jones | 280/233 |
| 4,941,673 A | * | 7/1990 | Bennett | 280/112.2 |
| 5,022,671 A | * | 6/1991 | Jones, Jr. | 280/250 |
| 5,280,936 A | * | 1/1994 | Schmidlin | 280/234 |
| 5,330,218 A | * | 7/1994 | Escudero | 280/245 |
| 5,383,676 A | * | 1/1995 | Valentino | 280/271 |
| 5,833,256 A | * | 11/1998 | Gilmore | 280/224 |

FOREIGN PATENT DOCUMENTS

| | | |
|---|---|---|
| DE | 196 14 836 A1 | 10/1997 |
| EP | 0 197 569 A2 | 10/1986 |

\* cited by examiner

*Primary Examiner*—Lesley D. Morris
*Assistant Examiner*—Tony Winner
(74) *Attorney, Agent, or Firm*—Oliff & Berridge PLC

(57) ABSTRACT

A manpower-driven cycle comprising a driving mechanism transforming a reciprocating motion of a handle into a rotary motion of a rear wheel. A steering and maintaining device comprises a telescopic actuating system with articulated tubes along parallelograms deformable in the direction of a longitudinal supporting rod. A pair of toothed meshing gears are linked by connecting rods to the telescopic actuating system to permanently maintain the handle axis in a vertical median plane passing through the rod.

8 Claims, 4 Drawing Sheets

MANPOWER-DRIVEN CYCLE WITH ROWER MECHANISM

STATE OF THE ART

The invention relates to a manpower-driven cycle comprising:

a frame with a straight bar equipped with a front steering wheel and a rear drive wheel, actuating means with a gripping handle operated by the user in a back-and-forth rowing movement, a driving mechanism transforming said back-and-forth movement into a rotation movement of the rear wheel, and means for guiding the front steering wheel in rotation.

STATE OF THE ART

Manpower-driven cycles transforming a rowing movement exerted by the user into a motion identical to that of a conventional bicycle are well known in the art. These cycles are intended for rowers who wish to discover new training grounds or for cyclists who want to have a complete muscular training. The benefits of rowing can thus be combined with the pleasures of cycling.

Such cycles are described in the documents DE 196 14 836 and EP 0 197 569. The transmission mechanisms used for directional steering and to transform the back-and-forth movement into a rotation movement of the wheel require complicated kinematics.

OBJECT OF THE INVENTION

The object of the invention is to achieve a cycle with a rowing mechanism that is easy to implement and has good stability when negotiating bends.

The device according to the invention is characterized in that the driving mechanism comprises:

a steering and maintaining device formed by a telescopic actuating system with tubes articulated in parallelograms deformable in the longitudinal direction of the bar, and axial centering means to maintain the axis of the handle constantly in the vertical mid-plane passing through the bar.

According to one feature of the invention, the axial centering means comprise at least one pair of toothed sprockets or sectors linked by connecting rods to the telescopic actuating system.

The user, sitting on the seat with his feet on the foot-rests and his hands on the handle, performs a rowing movement. The presence of the telescopic actuating system prevents any lateral movement of the handle, the axis of the latter remaining constantly in the vertical mid-plane passing through the central bar of the frame.

According to a preferred embodiment, the driving mechanism comprises a transmission device equipped with a traction cable having one end securedly affixed to the handle with back-and-forth movement and an opposite end linked to the drive chain of the rear wheel freewheel. The traction cable passes via at least one counter-pulley and through the hollow interior of the central bar. The means for guiding the front steering wheel in rotation comprise a steering cable linked to a driving pulley securedly affixed to the handle and to an operating pulley coupled to the rotating front fork of the steering wheel. The intermediate part of the steering cable zigzags on pulleys provided along the opposite edges of the parallelograms of the telescopic actuating system and on at least one counter-pulley located at the front of the cycle.

According to another feature of the invention, the steering and maintaining device is fitted with limited pivoting around a transverse axis between an appreciably horizontal lowered position and a raised position.

BRIEF DESCRIPTION OF THE DRAWINGS

Other advantages and features will become more clearly apparent from the following description of an embodiment of the invention, given as a non-restrictive example only and represented in the accompanying drawings, in which.

Description of a preferred embodiment

Figure 1:
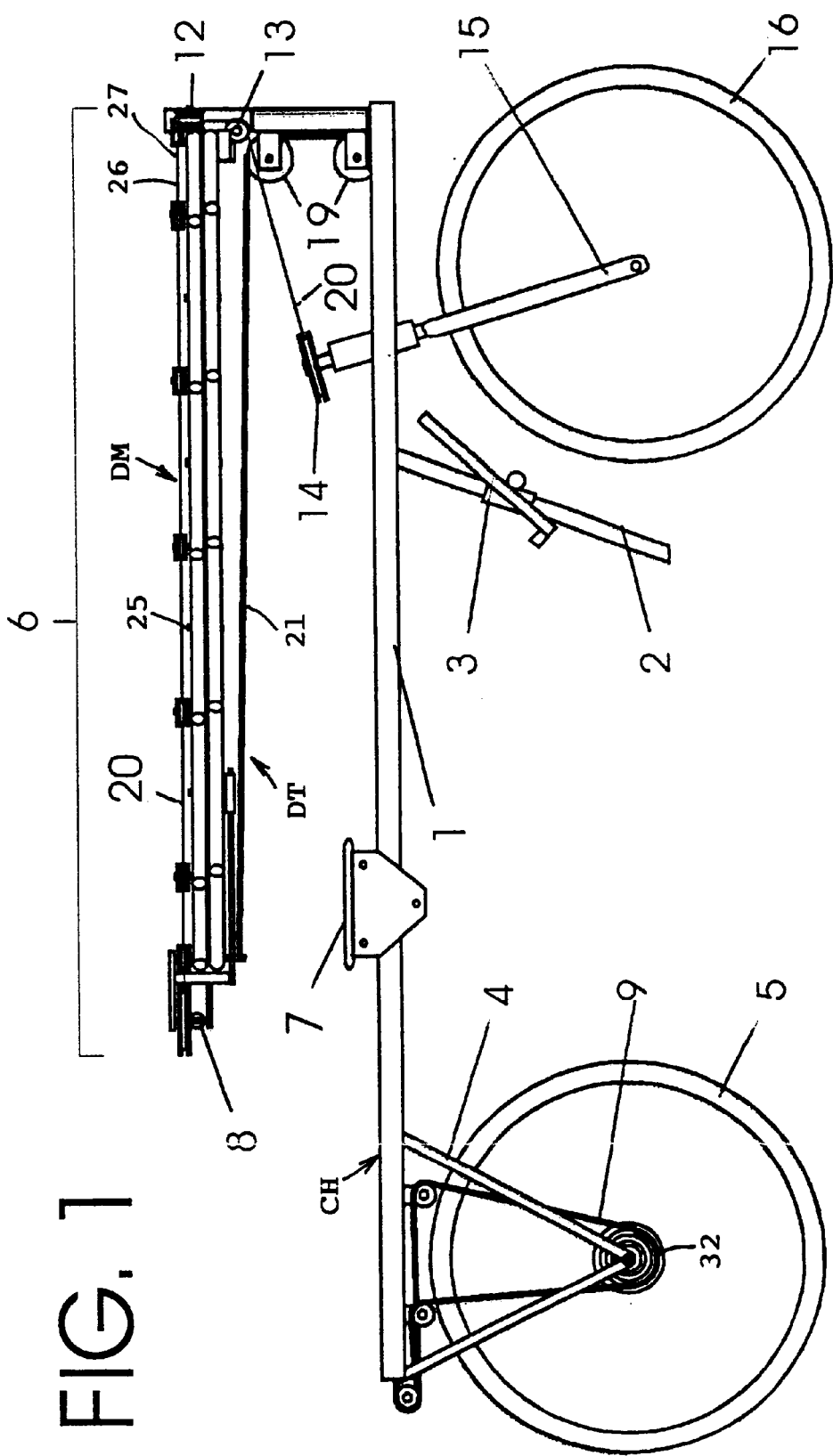
FIG. 1 is a side view of the cycle equipped with the mechanism according to the invention, the steering and maintaining device being in the normal lowered position.

With reference to FIGS. 1 to 5, a manpower-driven cycle comprises a rear drive wheel 5, a front steering wheel 16, a frame CH arranged between the two wheels 5, 16, and a driving mechanism 6 operated by the user.

The frame CH comprises a rigid bar 1 extending in the longitudinal direction and acting as support for a rear fork 4 receiving the rear drive wheel 5, and for a bracket 2 enabling the position of a pair of foot-rests 3 to be adjusted in height. A seat 7 is fitted sliding on the bar 1 between two stops defining a front position and a back position.

The driving mechanism 6 comprises a steering and maintaining device DM associated to a transmission device DT for transmitting the rowing movement to the rear drive wheel 5.

The steering and maintaining device DM is equipped with a handle 8 in the form of handlebars able to be moved by the user around a vertical axis for steering the cycle. The handle 8 is coupled to a telescopic actuating system 25 formed by tubes 17 articulated in the form of parallelograms deformable in the longitudinal direction. At the front, the telescopic actuating system 25 is linked by connecting rods 26, 27 to two rotating toothed sprockets 18 or sectors preventing movement of the handle 8 outside the mid-plane passing through the longitudinal axis of the bar 1. Opposite the sprockets 18, the telescopic actuating system 25 is equipped with a coupling means 28 engaged in an axial groove 29 of the handle 8. It is clear that the coupling means 28 can be replaced by a pair of sprockets of the same type as the toothed sectors 18 to achieve longitudinal alignment of the telescopic actuating system 25.

The alternating straight movement of the handle 8 with respect to the position of the foot-rests causes the drive wheel 5 to be driven in rotation by means of the transmission device DT. The latter comprises a traction cable 21 secured to an attachment 30 at the level of the handle 8 and passing over two counter-pulleys 19 before passing longitudinally through the hollow interior of the bar 1 from front to rear. Opposite the attachment 30, the other end of the traction cable 21 pulls on the chain 9 engaging on a sprocket of the free-wheel 32 when the back-and-forth movement of the handle 8 is performed. A derailleur device (not represented) enables the gear ratio to be adjusted according to the physical capacities of the user.

Driving of the cycle is achieved by a steering cable 20 driven by a driving pulley 10 securedly affixed to the handle 8 and linked at the other end to an operating pulley 14 coupled to the rotating front fork 15 of the steering wheel 16. The intermediate part of the steering cable 20 zigzags on pulleys 11 provided on the opposite side edges of the parallelograms of the telescopic actuating system 25 and on counter-pulleys 12, 13 located at the front of the cycle.

Figure 2:
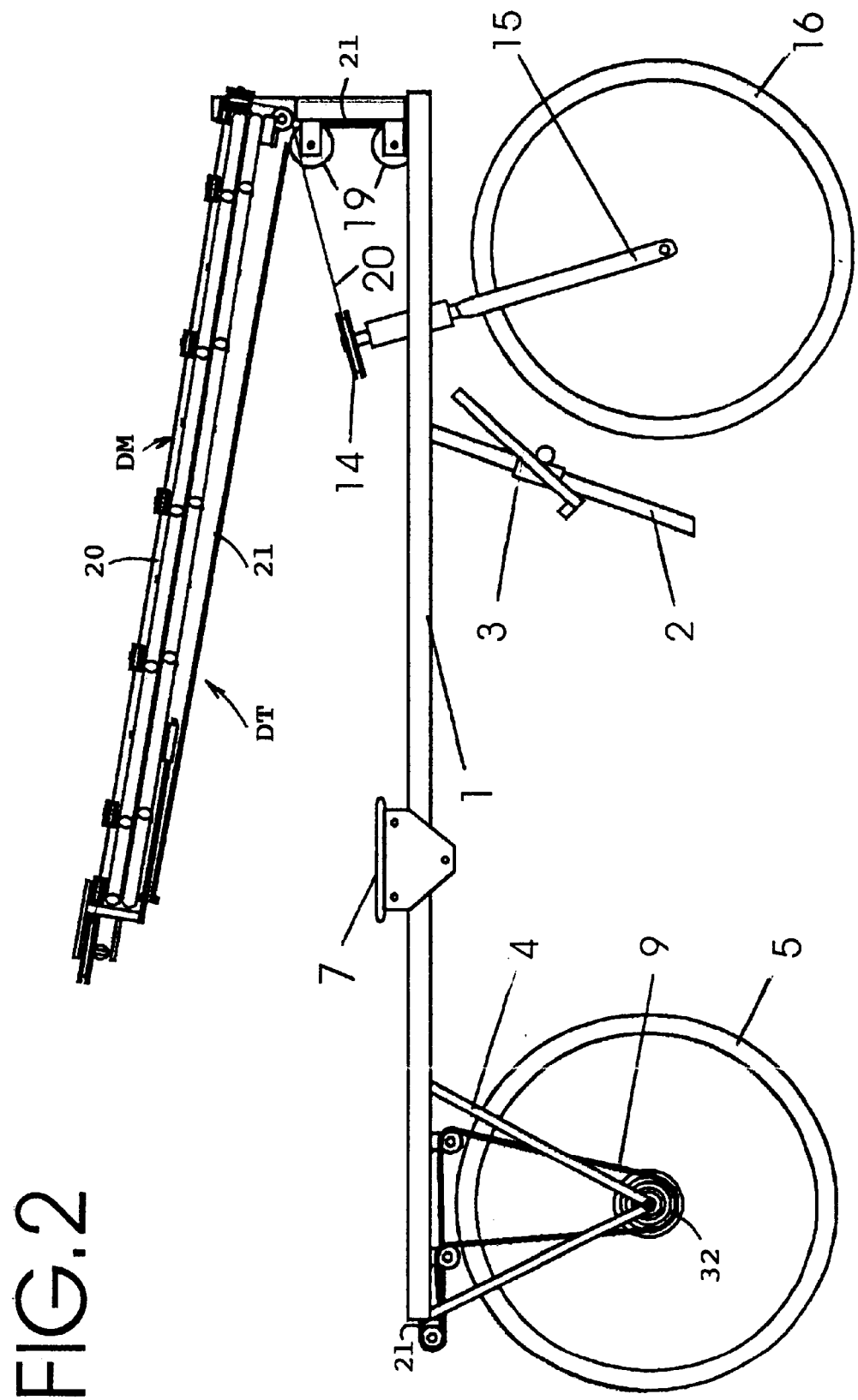
FIG. 2 shows an identical view to FIG. 1, the steering and maintaining device being in the raised position.

The steering and maintaining device DM of the driving mechanism 6 is fitted with limited pivoting around a transverse axis between an appreciably horizontal lowered position (FIG. 1) and a raised position (FIG. 2). An auxiliary control device by foot and/or on the handlebars enables braking to be performed as on a conventional bike.

Operation of the cycle driving mechanism 6 is as follows:

After he has sat down on the seat 7 and placed his feet on the foot-rests 3, the user in the first phase pulls the handle 8 towards him so as to stretch the telescopic actuating system (FIG. 4) and pull on the traction cable 21 to drive the chain 9 in the rotation direction of the drive wheel 5.

Figure 3:
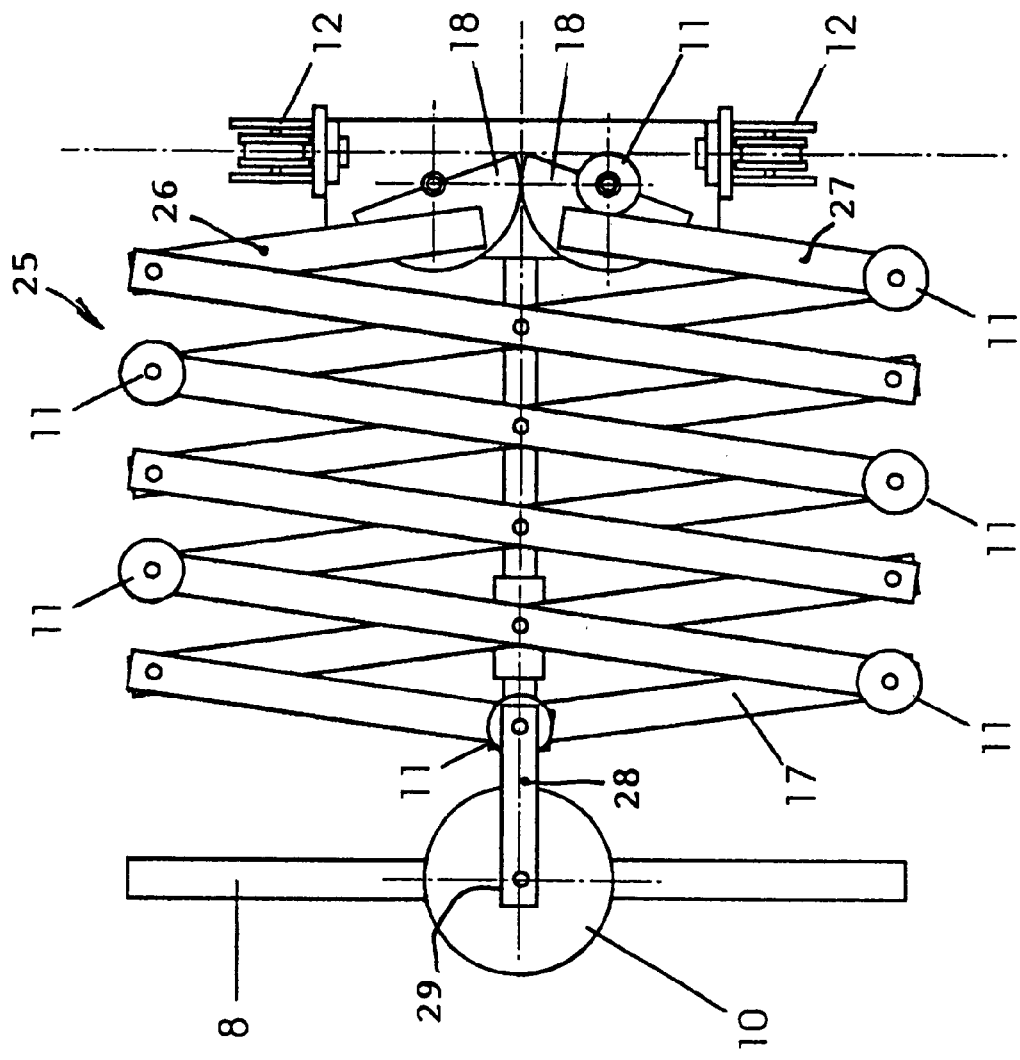
FIG. 3 represents a plan view of the steering and maintaining device of FIG. 1 in the folded position.
Figure 4:
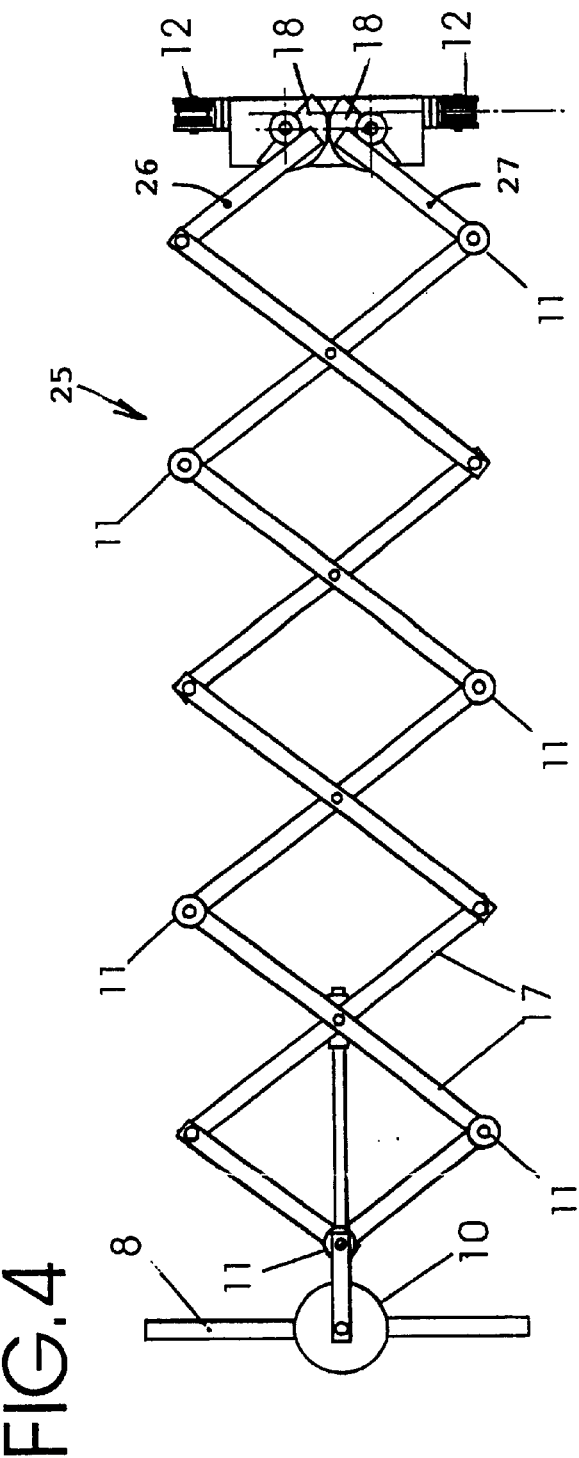
FIG. 4 is an identical view to FIG. 3 in the stretched position of the steering and maintaining device.
Figure 5:
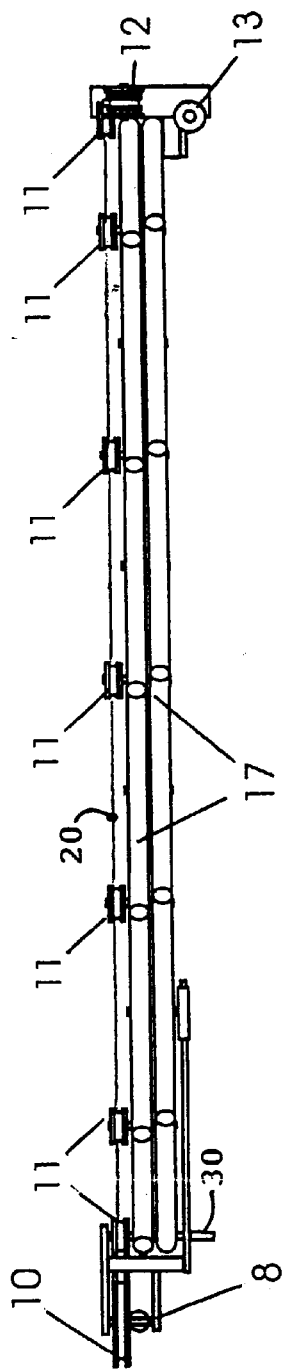
FIG. 5 is a side view of FIG. 4.

In the second phase, the user pushes the handle 8 forwards to move the deformable parallelograms of the telescopic actuating system 25 towards one another (FIG. 3). This movement results in a reverse movement of the traction cable 21 enabling the chain 9 to return by means of the freewheel 32 and of return means. Driving of the rear wheel 5 is not performed during this second phase of operation but the wheel 5 continues to turn due to the freewheel 32.

The user thus performs a rowing movement actuating the handle 8 from front to rear to make the drive wheel 5 rotate and to make the cycle move forwards. To change direction, the handle 8 simply has to be directed like a bike handlebars, the movement of the handle 8 being transmitted to the front fork 15 by the steering cable 20. The presence of the telescopic actuating system 25 enables the vertical axis of rotation of the handle 8 to be kept constantly in the mid-plane of the bar 1 when the combined driving and steering movements are performed.

According to an alternative embodiment, guiding of the front wheel 16 in rotation by means of the steering cable 20 can be performed by any other kinematic transmission means coupled to the handle 8.

The steering and maintaining device DM can have a preset, non-telescopic, length. Driving of the chain 9 is then performed by the mobile support 2 of the foot-rests 3 able to slide along the bar 1 to make the cycle move forwards.

What is claimed is:

1. A manpower-driven cycle, comprising:
    a frame with a straight bar equipped with a front steering wheel and a rear drive wheel,
    actuating means with a gripping handle operated by the user in a back-and-forth rowing movement,
    a driving mechanism transforming said back-and-forth movement into a rotation movement of the rear wheel,
    and means for guiding the front steering wheel in rotation,
    wherein the driving mechanism includes: a maintaining device formed by a back-and-forth actuating system formed by tubes articulated in parallelograms which are deformable in the longitudinal direction of the bar, and axial centering means coupled to said parallelograms to maintain the axis of the handle constantly in the vertical mid-plane passing through the bar.

2. The cycle according to claim 1, wherein the axial centering means comprises at least one pair of toothed sprockets or sectors linked by connecting rods to the back-and-forth actuating system.

3. The cycle according to claim 1, wherein the driving mechanism comprises a transmission device equipped with a traction cable having one end securedly affixed to the handle with back-and-forth movement and an opposite end linked to the drive chain of the rear wheel freewheel.

4. The cycle according to claim 3, wherein the traction cable passes via at least one counter-pulley and through a hollow interior of the central bar.

5. The cycle according to claim 1, wherein the means for guiding the front steering wheel in rotation comprise a steering cable linked to a driving pulley securedly affixed to the handle and to an operating pulley coupled to the rotating front fork of the steering wheel.

6. The cycle according to claim 5, wherein an intermediate part of the steering cable zigzags on pulleys provided along the opposite edges of the parallelograms of the back-and-forth actuating system and on at least one counter-pulley located at the front of the cycle.

7. The cycle according to claim 1, wherein the steering and maintaining device is fitted with limited pivoting around a transverse axis between an appreciably horizontal lowered position and a raised position.

8. The cycle according to claim 1, wherein the bar is provided,with a sliding seat and with a bracket supporting foot-rests.

* * * * *